July 18, 1967 R. E. BOWLES 3,331,379

WEIGHTED COMPARATOR

Filed May 31, 1963 2 Sheets-Sheet 1

INVENTOR,

ROMALD E. BOWLES

BY Harry M. Saragovitz, Edward J. Kelly, Herbert Berl & R. C. Lucke

ATTORNEYS

July 18, 1967 R. E. BOWLES 3,331,379

WEIGHTED COMPARATOR

Filed May 31, 1963 2 Sheets-Sheet 2

INVENTOR,
ROMALD E. BOWLES

BY Harry M. Saragovitz, Edward J. Kelly, Herbert Berl & R. C. Lucke ATTORNEYS

United States Patent Office 3,331,379

Patented July 18, 1967

3,331,379

WEIGHTED COMPARATOR

Romald E. Bowles, Silver Spring, Md., assignor to the United States of America as represented by the Secretary of the Army Filed May 31, 1963, Ser. No. 284,762
The portion of the term of the patent subsequent to Sept. 13, 1983, has been disclaimed
8 Claims. (Cl. 137—81.5)

Figure 1:
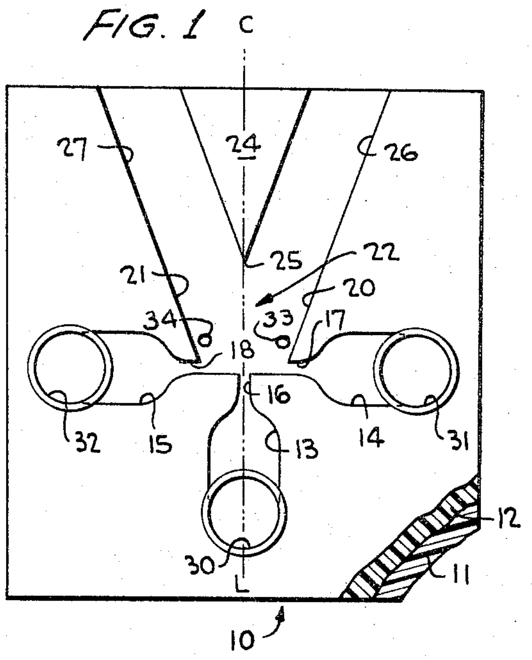
Figure 2:
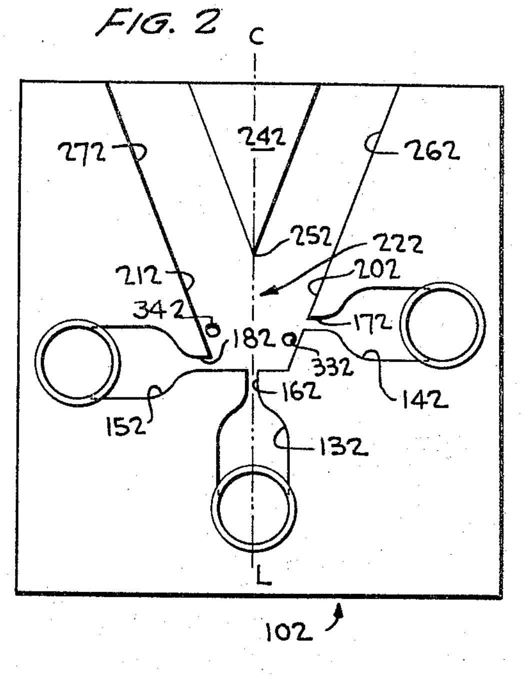

The invention described herein may be manufactured and used by or for the Government for governmental purposes without the payment to me of any royalty thereon.

This invention relates generally to pure fluid amplifier systems and more specifically to a weighted differential fluid amplifier for comparing differentials in magnitude between fluid input signals.

In general, the comparison of pressure differentials between analog-type, fluid input signals can be most readily achieved by a fluid comparator. Basically, a comparator is a logic component which effectively compares the instantaneous magnitudes of one signal to that of another fluid signal and produces an output signal corresponding to the sense and magnitude of differentials that exist between the two signals.

The fluid comparators disclosed in detail hereinafter do not incorporate any moving parts other than the operating fluid, and therefore do not suffer from the disadvantages normally associated with mechanically moving elements which are employed in existing mechanical comparators. In known mechanical comparators, frictional forces that are developed by interacting mechanical parts, such as valves and pistons create heat and wear in the device incorporating such parts. In addition, the inertia of the moving parts in conjunction with the associated frictional forces increase the overall response time and the residual hysteresis of the device. Since a comparator is required to switch its flow in response to securing changes of some condition, for instance, a change of fluid pressure, a short time constant and control of the residual hysteresis characteristic are important advantageous features. It is, therefore, primarily important to reduce or eliminate, if possible, all moving mechanical parts from the comparator unit. The fluid comparators of the instant invention employ only fluid input signals to operate; all elements forming the units remain stationary during operation thereof, so that the comparators may have a minimum response time and a low hysteresis characteristic.

As contemplated in this invention, the pure fluid comparator relies solely upon stream interaction to effect a comparison function, and stream interaction in general results in energy losses. Therefore it may be either essential or desirable to amplify the fluid signals supplied to the comparator before the signal is supplied to a utilization device. Such an amplifier, however, should preferably preserve the differential nature of the output signals; that is, the amplifier should also be of a differential type, while possessing the capabality of functioning without any moving mechanical parts.

In accordance with one basic embodiment of this invention, a typical fluid comparator amplifier comprises a power nozzle for issuing what will hereinafter be referred to as a power stream into one end of an enclosed interaction chamber of essentially rectangular cross-section. A pair of control nozzles are positioned at an angle relative to the power nozzle and issue fluid streams hereinafter referred to as control streams, into interaction with the power stream. The lower energized control streams interacting with the higher energized constricted power stream effect amplified directional displacement of the higher energized power stream in the interaction chamber.

The interaction chamber is defined in a typical case by an end wall and two outwardly diverging sidewalls hereinafter referred to as the left and right sidewalls. Although the sidewalls can be used to confine the fluid to the interacting chamber and thus make it possible to have the streams interact in a region at some desired pressure, the sidewalls may be positioned so that they are remote from the high velocity portions of the interacting streams. Thus, the interaction between the streams and consequently the final direction of the combined streams is a function of the relative momentums of the power stream and the two control streams with the sidewalls having little effect on the results of the interaction.

Alternatively, however, the left and right sidewalls of the interaction chamber may be positioned sufficiently close to the orifices of the angularly disposed nozzles so that boundary layer effects are created between the combined fluid streams and the sidewalls of the interaction chamber. Such a construction would result in the switching of the combined stream into one or the other of a pair of output passages depending upon the relative magnitudes between the fluid signals supplied to the nozzles. For example, if left and right nozzles supplied interacting fluid streams into the interaction chamber and the right nozzle supplied a fluid signal of greater magnitude than that supplied to the left nozzle the combined fluid stream would attach to the left sidewall and egress from the left output passage with little or no fluid output from the right output passage. Thus, the positioning of the sidewalls in the interaction chamber governs the type of output which can be anticipated from the comparator for a given input signal supplied to the nozzles.

A V-shaped divider is disposed at a predetermined distance from the end wall with the apex of the divider disposed along a center line taken symmetrically through the unit, the sides of the divider being generally parallel to the left and right sidewalls of the interaction chamber. The regions between the sides of the divider and the left and right sidewalls define left and right output passages, respectively.

With regard to the aforementioned control nozzles, the left control nozzle of the pair is positioned with respect to the divider and the interaction chamber so that it displaces all or essentially all of the power stream into the right passage, the right control nozzle being correspondingly positioned to displace all or essentially all of the power stream into the left passage. If the control nozzles have substantially equal cross-sectional areas when the differential in pressure between the interacting control streams is zero or substantially zero, the momenta of the control streams would be equal and the power stream would not be displaced. Accordingly, the power stream would be bisected by the apex of the divider and the combined power and control streams would divide equally between the two outlet passages.

The momentum of a control stream depends upon the size and speed of the stream and upon the density, viscosity, compressibility and other properties of the fluids involved. For purposes of simplicity of explanation, it will be assumed that the size of the two interacting streams and the fluid applied to both nozzles are the same. It is to be understood, however, that any one or more of these properties may be varied in order to impart predetermined characteristics to the system. In a system where the control nozzle sizes are equal and the fluids are the same, then equal pressures applied to the fluids supplied to the two control nozzles produce streams of equal mass flows and equal energies for displacing the power stream. Therefore, a null condition in such a system indicates an equality of the three basic parameters of fluid flow. If it is desired, however, to separate the effect of these three parameters and detect a null condition in only one of them; for instance, mass flow, then differences must be developed in the streams. In one embodiment of this invention, the size of one of the control nozzles is made larger than the other. Under this condition, when the pressures of the fluid applied to the two control nozzles are equal, the velocities of the streams are equal but their mass flows and therefore momenta, are unequal. Since the direction of the combined power and control streams is a function of the relative momenta of the streams, the combined streams in this case are displaced from the center or null condition.

In order to produce a null, the pressure of the fluid applied to the relatively smaller cross-sectioned control nozzle must be increased so as to increase the mass flow and velocity of the fluid issuing from that nozzle. Since the energy of a stream is a function of both mass flow and pressure, control streams with equal energies produce a different directivity of the power stream from either of the other two parameters. Thus, by proper calibration of the pure fluid comparator amplifier one may determine distinct nulls for each of the parameters of the combined power and control stream. The above technique provides a weighted comparator amplifier in that the pressure of one supply to one control nozzle must exceed the pressure of the other supply to the other control nozzle by a fixed amount before a null condition will occur.

Broadly, therefore, it is an object of this invention to provide a weighted differential fluid comparator having no moving mechanical parts.

Another object of this invention is to provide a weighted fluid comparator including a pure fluid amplifier wherein the output of the amplifier is biased.

Still another object of this invention is to provide a weighted fluid comparator including a power nozzle for issuing a defined power stream and a pair of opposed control nozzles for issuing control fluid streams in interacting relationship with the power stream to effect amplified directional displacement thereof, the comparator being constructed so as to issue a biased output signal when the input signals are substantially of the same magnitude.

The above and still further objects, features and advantages of the present invention will become apparent upon consideration of the following detailed description of several specific embodiments thereof, especially when taken in conjunction with the accompanying drawings, wherein:

FIGURE 1 illustrates a plan view of one embodiment of a weighted pure fluid comparator in accordance with this invention; and FIGURES 2–6 inclusive, illustrate plan views of other possible embodiments of weighted pure fluid comparators constructed in accordance with this invention.

Referring now to FIGURE 1 of the accompanying drawings for a more complete understanding of the invention, there is shown one embodiment of a pure fluid weighted comparator.

The comparator 10 is formed in a flat plate 11 by molding, milling, casting or by other techniques which will form the necessary passages and cavities therein. The plate 11 may be composed of any material compatible with the fluid employed, and may, for example, be composed of metal, plastic, ceramic or other suitable material. The fluid employed may be gaseous or liquid or combinations thereof.

The plate 11 is covered with another flat plate 12, which is clamped or otherwise sealed to the plate 11, for instance, by machine screws, clamps, adhesives, or by any other suitable means. It is of primary importance, however, that the connection between the plates be fluid-tight so that the fluid flows only within the passages and cavities formed in the plate 11.

The fluid comparator 10 may include a power nozzle 13 and a pair of control nozzles 14 and 15 which terminate in orifices 16, 17 and 18, respectively, the orifices communicating with the sidewalls 20 and 21 of a stream interaction chamber 22. A symmetrical V-shaped flow divider 24 is located between the sidewalls 20 and 21, the sides of the divider 24 defining the interior sidewalls of output passages 26 and 27. Fluid input signals are supplied to the comparator 10 through inlet ducts or tubes 30, 31 and 32 communicating with the nozzles 13, 14 and 15, respectively. For the purpose of illustrating the functioning of a fluid pressure comparator, it may be assumed that the fluid input signals supplied to the ducts 30 and 31 are maintained at constant reference pressures and that the duct 32 receives a variable or fluctuating pressure input signal. The fluctuating pressure signal supplied to the tube 32 may, for instance, be generated by a conventional condition-responsive fluid device such as an expandable and collapsible pressure bellows or by a pivoting nozzle that supplies varying amounts of pressurized fluid to the duct 32 as determined by the angular position of the nozzle relative thereto.

The orifice 18 of the control nozzle 15 has a larger cross sectional area than orifice 17 of the control nozzle 14, and although the pressure of the input fluid signal supplied to the control nozzle 14 is the same as the pressure of the fluid signal applied to the control nozzle 15, a relatively greater signal flow rate and momentum will issue from the orifice 18 as compared to the flow rate and momentum of the fluid issuing from the orifice 17. The power stream issuing from the power nozzle 13 will therefore tend to be biased into the passage 26 by interaction with the greater magnitude control signal issuing from the control nozzle 15.

In order to have a null in the comparator 10; that is, symmetrical flow with respect to the centerline CL, the magnitude of the pressure supplied to the nozzle 15 would have to be less than the magnitude of the pressure supplied to the nozzle 14.

In the absence of fluid issuing from the power nozzle 13, the opposing fluid streams issuing from the control nozzles 14 and 15 will interact in the interaction chamber 22 and the greater momentum and flow rate of the fluid issuing from the nozzle 15 will cause essentially all of the fluid from the control nozzle 14 to enter the passage 26 along with a portion of the fluid egressing from the control nozzle 15. A null will exist only if the magnitude of the pressure of fluid supplied to the control nozzle 15 is less than the pressure of the fluid supplied to the nozzle 14 and then only tenuously if there is any sidewall effect since sidewall effects cause a bistable operation characteristic even in the absence of fluid issuing from power nozzle 13. In order to eliminate sidewall effects outlets 33 and 34 bored through the plate 11 may be provided and positioned adjacent the sidewalls 20 and 21, respectively, the outlets discharging fluid to and from an ambient pressure or predetermined pressure system and thereby equalizing pressures on both sides of the chamber 22.

While the comparator 10 is illustrated as being a momentum exchange type of fluid amplifier, as discussed hereinabove, if the sidewalls 20 and 21 were positioned sufficiently proximate the interacting fluid streams, then boundary layer effect would be created producing a positive feedback effect. If the sidewalls are very close to the power stream then the combined fluid stream would egress from either output passage 26 or 27 depending upon the relative magnitudes of the input signals supplied to the nozzles 15 and 14, respectively. In such a comparator configuration a "null" will not occur since the fluid stream will be flowing in either the output passage 26 or the output passage 27, and of course, there would be no outlets, such as the outlets 33 and 34, for equalizing the pressures between the sidewalls 20 and 21 and the interacting fluid streams and thereby preventing the creation of boundary layer effects.

Since the control nozzle orifice 172 is located further downstream of the chamber 222 than the control nozzle orifice 182, the displacement effect upon the power stream issuing from the power nozzle 132 will be less than the displacement effect of fluid issuing from the control nozzle 152. Consequently, the component 102 is weighted in favor of the control nozzle 152.

Figure 3:
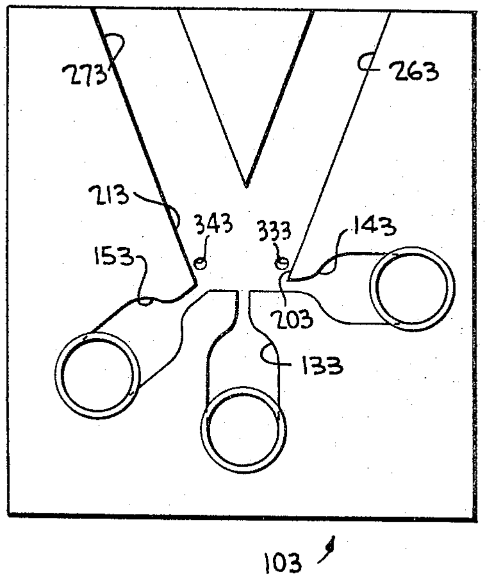

FIGURE 3 illustrates another embodiment of a pure fluid weighted comparator 103 wherein the control nozzle 143 is positioned at substantially 90° with respect to the longitudinal axis of the power nozzle 133 and the control nozzle 153 is positioned at an angle considerably less than 90° with respect to the longitudinal axis of the power nozzle 133. Since the defined control stream issuing from the control nozzle 153 interacts at a reduced angle (less transverse momentum) with the power stream issuing from the power nozzle 133 downstream of the point of interaction between the power stream and the defined control stream issuing from the control nozzle 143, the control nozzle 153 is less effective in displacing the power stream into the output passage 263 than the control nozzle 143 is in displacing the power stream into the output passage 273. Thus, for the same magnitude input signals supplied to the control nozzles 143 and 153 the output of the component 103 will be weighted or biased in favor of the output passage 273. Outlets 333 and 343 may be provided adjacent sidewalls 203 and 213, respectively to prevent the creation of boundary layer effects along these sidewalls. In order to provide a null in the output of component 103, the control nozzle 153 would have to receive an input signal of greater magnitude than that received by the control nozzle 143.

Figure 4:
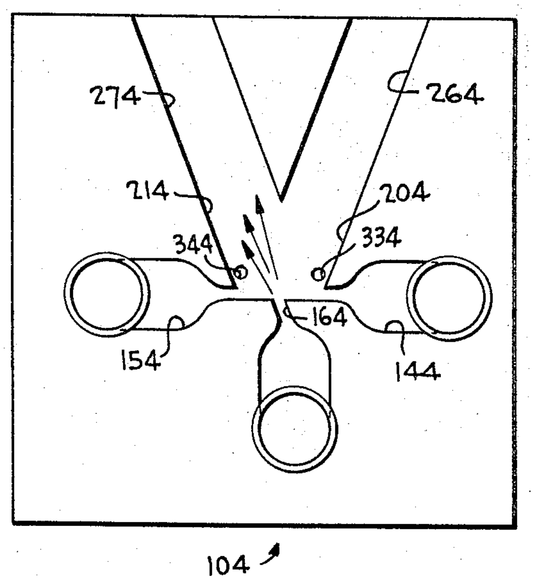
Figure 5:
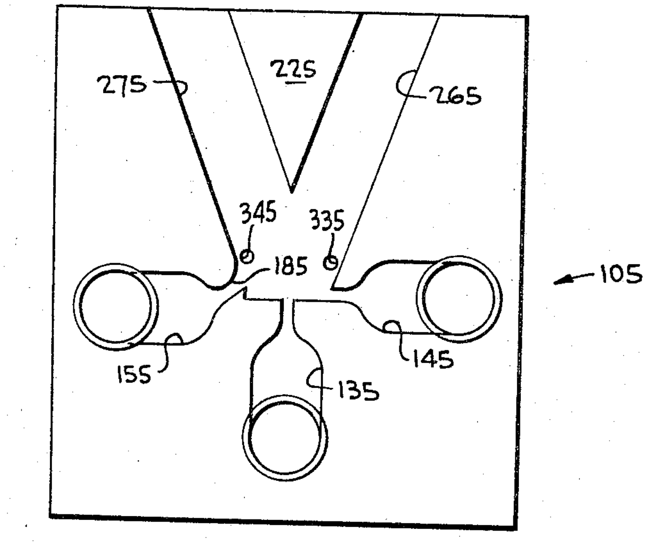

FIGURE 4 illustrates a weighted fluid comparator 104 wherein the orifice 164 of the power nozzle 134 is angularly disposed relative to the longitudinal axis of the nozzle so that the power stream is directed into the output passage 274. Thus, in the event the control nozzles 144 and 154 receive fluid input signals of substantially the same magnitude, the output of component 104 will be weighted in favor of the output passage 274. Outlets 334 and 344 may be provided adjacent sidewalls 204 and 214, respectively to prevent the generation of boundary layer effects.

The component 104 could also be weighted in favor of the output passage 274 in the event the orifice 164 were machined, or formed, in substantial alignment with that output passage.

The orifice of a control nozzle may also be angularly disposed relative to the longitudinal axis of the control nozzle to provide a weighted fluid comparator. The comparator 105 illustrated in the accompanying drawings provides an orifice 185 for a control nozzle 155, the orifice 185 being chamfered or otherwise formed to align with the output passage 265. Since the control stream issuing from the orifice 185 will interact at an angle with the power stream issuing from the power nozzle 135 downstream of the area of interaction between the control stream from the control nozzle 145 and the power stream, the control signal supplied to the control nozzle 155 will be less effective in displacing the power stream across the apex of the divider 225 and therefore the comparator 105 will be weighted in favor of the output passage 275.

Figure 6:
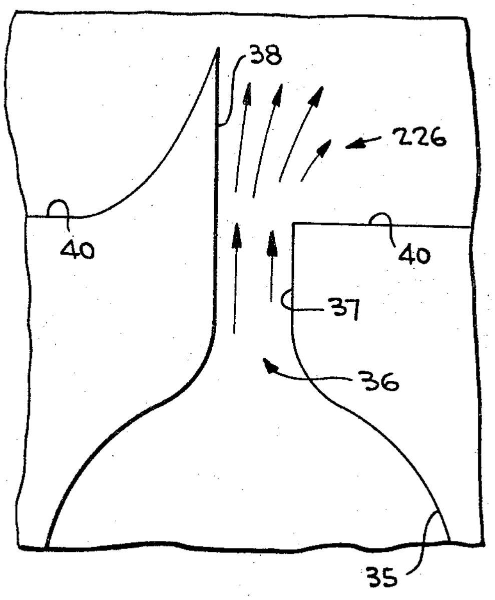

FIGURE 6 illustrates a nozzle 35, which may be employed as a power or control nozzle in a pure fluid amplifier of the type disclosed hereinabove to provide a weighted fluid comparator. The nozzle 35 includes an orifice 36 formed by rectangular sidewalls 37 and 38, respectively. The sidewall 37 terminates with substantially planar portion of a sidewall or end wall 40 of the interaction chamber 226. The sidewall 38 extends outwardly from the plane of the sidewall 40 a distance sufficient to cause the stream issuing from the nozzle 35 to discharge more towards the right than towards the left, as viewed in FIGURE 6 for a given length of sidewall 38. Thus, a fluid amplifier in which the nozzle 36 is incorporated will be biased in accordance with the position of the greater length of orifice sidewall.

In addition to the above-disclosed embodiments, weighted pure fluid comparators may also be provided by asymmetrically positioning the divider relative to the power nozzle orifice and the centerline CL so that the flow pattern in the output passages is asymmertical, positioning the orifice of the power nozzle off center from the centerline CL, so that asymmetrical flow is received by the output passages, providing different impedances to the elements supplying fluid to each control nozzle so that correspondingly different velocity profiles exist between the fluids issuing from each control nozzle, or the fluids supplied to each control nozzle can be of different quality, as in the case of steam, or the fluids supplied to each control nozzle may entrain different quantities of particles.

As mentioned hereinabove, a low residual hysteresis characteristics is an advantageous characteristic of a comparator. In order to clearly understand what is meant by the term "residual hysteresis" as applied to pure fluid components, assume that a stream of fluid is flowing through the interaction chamber 22. The stream entrains the fluid on both sides of the chamber and tends to reduce the pressure on each side of the chamber as a result of the extraction of fluid due to entrainment. If the streams issuing from the orifices of the nozzles have equal characteristics the resulting combined stream divides equally with respect to the apex of the V-shaped divider 24 and the combined stream of fluid is then equally effective in removing fluid from both sides of the chamber so that any reduction in the pressure in the regions between the two sidewalls 20 and 21 of the interaction chamber 22 and the sides of the fluid stream is equal.

However, if the two input streams have different parameters the combined stream will be deflected towards one sidewall rather than the other, for instance, closer to the sidewall 20 than the sidewall 21 due to the fact that the pressure region between one side of the stream and the sidewall 20 becomes smaller than the corresponding pressure region on the other side of the stream. The pressure in the region between the one side of the stream is thusly reduced to a greater extent than the pressure in the region between the other side of the stream and the sidewall 21. This phenomenon may result in a differential in pressure across the combined stream which insofar as the comparator is concerned, has the same effect as a differential in parameters between the two input signals. In consequence, the apparatus may not go through null directly when the signals from the two orifices are equal since the differential in pressure created by the stream being closer to one sidewall than to the other sidewall must also be overcome.

This phenomenon has been hitherto referred to as the residual hysteresis characteristic of the fluid comparator and represents the percent change in pressure required to switch from a null condition, once the null condition is established. The outlets 33 and 34 in the embodiment of FIGURE 1 and the corresponding outlets 332, 342; 333, 343; and 334, 344 shown in FIGURES 2, 3 and 4 respectively permit the ingress and egress of fluid into the interaction chambers depending upon the relative pressure differences between the interaction chamber ends of the outlets and the external ends of the outlets. In general, these outlets reduce the residual hysteresis of the comparator in which they are incorporated because they tend to maintain equal pressure differences between the both sides of the fluid power stream.

Although the comparator 10 possesses some residual hysteresis, the amount of residual hysteresis in any of the above disclosed comparators is less than that in known comparators of a mechanical type which incorporate moving mechanical parts, and concurrently the switching time of the pure fluid comparator 10 is less than that of comparators of a mechanical type.

As will be apparent to those skilled in the art, the fluid output signals from the weighted fluid comparators disclosed hereinabove may be used to control or actuate other types of pure fluid units or other types of systems which utilize fluid for the control or operation thereof. In the event a power gain is not desired, the power nozzle may either be turned off or the comparator may be formed without incorporating a power nozzle.

While I have described and illustrated several specific embodiments of my invention, it will be clear that variations of the details of construction which are specifically illustrated and described may be resorted to without departing from the true spirit and scope of the invention as defined in the appended claims.

I claim:

1. A weighted pure fluid comparator comprising an interaction chamber for receiving and confining fluid streams therein and having upstream and downstream ends, plural output passages for differentially receiving fluid from said interaction chamber and communicating with the downstream end thereof, a power nozzle communicating with the upstream end of said chamber for issuing a defined power stream into said chamber, at least a pair of control nozzles angularly disposed with respect to said power nozzle for issuing defined streams into said interaction chamber in interacting relationship with said power stream so as to effect displacement thereof in said chamber, one of said control nozzles issuing a constant stream of fluid to provide a standard against which flow from the other of said control nozzles may be compared, and the other of said nozzles issuing a continuous and variable stream of fluid at least one of the nozzles having a physical parameter relative to the other of said nozzles such that, upon issuance of fluid by said at least one of said nozzles, the power stream is biased to direct more flow to one of said output passages than the other of said output passages.

2. The weighted fluid comparator as claimed in claim 1 wherein the egress orifice of one of said control nozzles is larger than the egress orifice of the other control nozzle.

3. The weighted fluid comparator as claimed in claim 1 wherein said power nozzle lies at an angle other than zero degrees relative to the centerline of said chamber so as to direct a greater amount of the power stream into one output passage than the other output passage.

4. The weighted fluid comparator as claimed in claim 1 wherein one control nozzle is positioned with respect to said interaction chamber such that the power stream displacing effect of the stream issuing from said one control nozzle is greater than the power stream displacing effect of the other of said control nozzles when fluids under equal pressures are applied thereto.

5. The weighted fluid comparator as claimed in claim 1 wherein the angle betwen one of said control nozzles and said power nozzle is different from the angle between said power nozzle and another control nozzle said control nozzles lying in a common plane.

6. A pure fluid device comprising an interaction region for fluid streams, at least a pair of substantially aligned passages arranged on opposite sides of a centerline of said interaction region for issuing oppositely directed streams of fluid into interaction with one another to produce a pressure null in said interaction region and at least one output passage located adjacent one end of said interaction region, at least one of said passages lying at an angle of at least 90° relative to said centerline, for receiving a fluid signal which is a function of the relative magnitudes of a flow parameter of said streams as determined by the position in said interaction region of said pressure null, said angle of at least 90° relative to said centerline being measured from a portion of the centerline more distant from the output passage than said pair of substantially aligned passages.

7. A pure fluid comparator comprising an interaction chamber for receiving and confining fluid streams therein and having plural output passages for receiving fluid from said interaction chamber, at least a pair of nozzles angularly disposed with respect to each other communicating with said chamber for issuing defined streams from opposite sides of a centerline of said chamber into interacting relationship, one of said nozzles lying at an angle of at least 90° relative to said centerline, said nozzles being constructed and arranged to issue interacting streams with fluid parameters such as to produce a pressure null in said interaction region at a location variable with respect to said outlet passages as a function of the interacting streams, said angle of at least 90° relative to said centerline being measured from a portion of the centerline more distant from the output passage than said pair of substantially aligned passages.

8. A pure fluid comparator comprising an interaction chamber for receiving and confining fluid streams therein and having at least one output passage for receiving fluid from said interaction chamber, at least a pair of nozzles angularly disposed with respect to each other communicating with said chamber from opposite sides of the centerline thereof for issuing defined streams in interacting relationship, one of said nozzles lying at an angle of 90° relative to said centerline, said nozzles being constructed and arranged to issue interacting streams with fluid parameters such as to produce a pressure null in said interaction region at a location variable with respect to said outlet passage as a function of the interacting streams.

References Cited

UNITED STATES PATENTS

| | | | |
|---|---|---|---|
| 3,001,539 | 9/1961 | Hurvitz | 137—81.5 |
| 3,020,714 | 2/1962 | Eggers et al. | 137—81.5 XR |
| 3,024,805 | 3/1962 | Horton | 137—81.5 |
| 3,080,886 | 3/1963 | Severson | 137—81.5 |
| 3,093,306 | 6/1963 | Warren | 137—81.5 XR |
| 3,107,850 | 10/1963 | Warren et al. | 137—81.5 XR |
| 3,122,165 | 2/1964 | Horton | 137—81.5 |
| 3,124,160 | 3/1964 | Zilberfarb | 137—81.5 |
| 3,131,601 | 5/1964 | Curran. | |
| 3,174,497 | 3/1965 | Sowers | 137—81.5 |
| 3,185,166 | 5/1965 | Horton et al. | 137—81.5 |
| 3,209,774 | 10/1965 | Manion | 137—81.5 |

M. CARY NELSON, *Primary Examiner.*

LAVERNE GEIGER, *Examiner.*

SAMUEL SCOTT, *Assistant Examiner.*